July 28, 1964 R. T. LOWE 3,142,610
SELF-DAMPED COMPOSITE STRUCTURES
Filed April 13, 1960 2 Sheets-Sheet 1
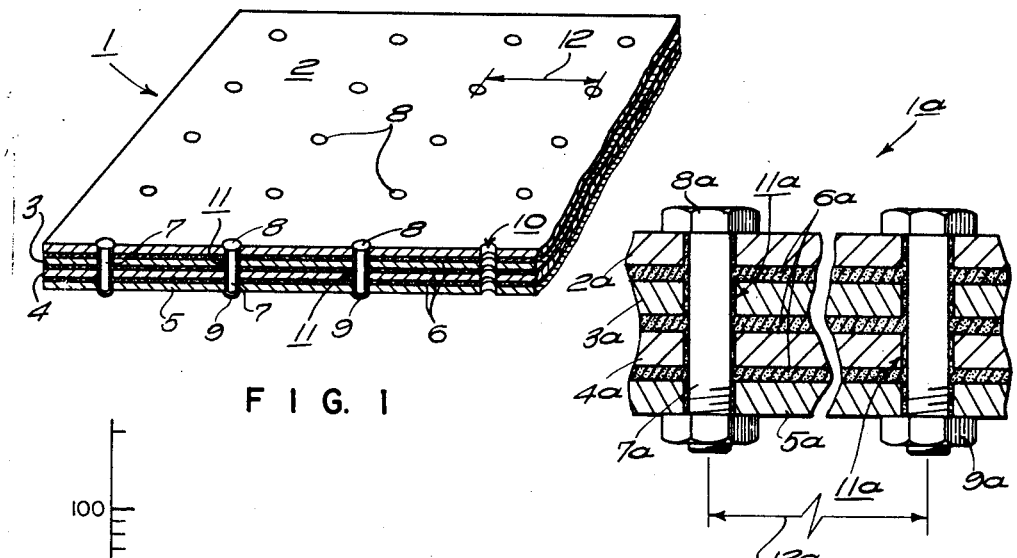
FIG. 1
FIG. 2
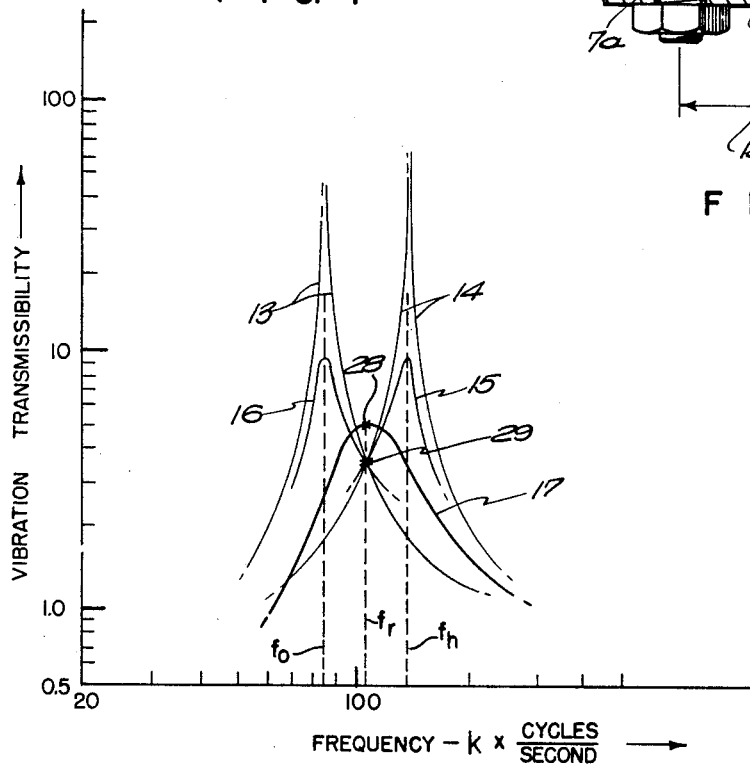
FIG. 3
INVENTOR.
RUSSELL T. LOWE
BY
Dike, Thompson & Bronstein
ATTORNEYS July 28, 1964 R. T. LOWE 3,142,610
SELF-DAMPED COMPOSITE STRUCTURES
Filed April 13, 1960 2 Sheets-Sheet 2
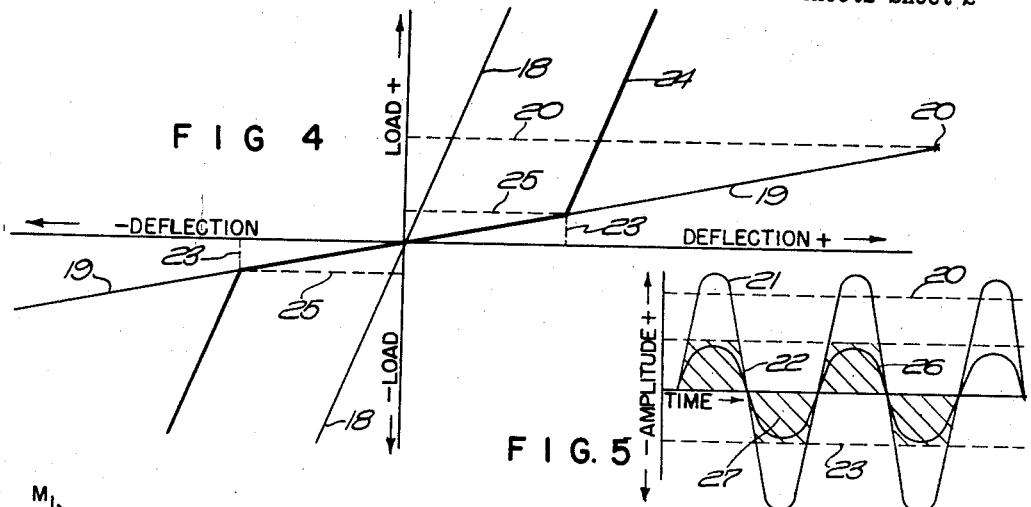
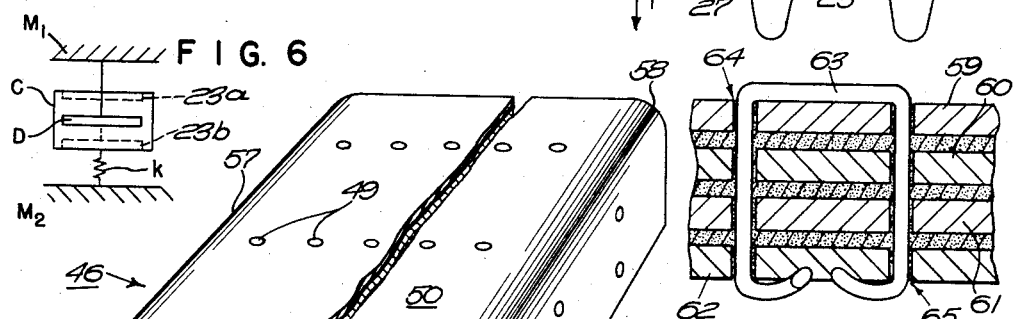
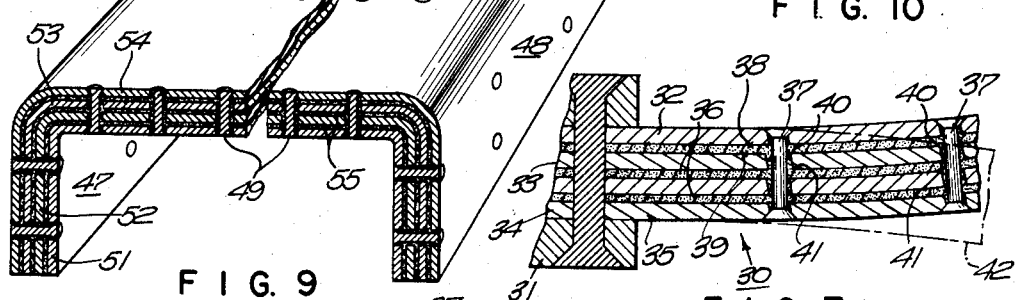
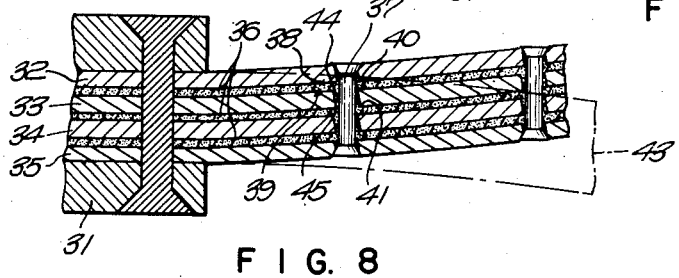
INVENTOR.
RUSSELL T. LOWE
BY
Dike, Thompson & Bronstein
ATTORNEYS United States Patent Office 3,142,610
Patented July 28, 1964

3,142,610
SELF-DAMPED COMPOSITE STRUCTURES
Russell T. Lowe, Granada Hills, Calif., assignor to Barry Wright Corporation, Watertown, Mass., a corporation of Massachusetts
Filed Apr. 13, 1960, Ser. No. 22,051
4 Claims. (Cl. 161—54)

The present invention relates to improvement of the vibration and strength characteristics of structural members and, in one particular aspect, to novel and improved composite laminated structures of sheet-like proportions which exhibit high structural strengths of solid stock and yet are inherently self-damped to suppress responses to excitation of vibratory character.

In the design of structural elements, there must often be considered not only the simple static or slowly-varying loadings to be withstood by these elements, such as the loadings of tension, compression and shear, but also the complex dynamic forces which can be encountered under conditions of shock and vibration. The latter conditions are likely to involve large peak forces, and transient and sustained effects, occurring over wide frequency ranges, with the result that a highly complicated interplay of forces makes it virtually impossible to predict and correct for all the potential weaknesses of a structure. Failures due to fatigue and unexpected peak loadings are common examples of such destructive dynamic actions. A convenient approach to reducing these difficulties has been that of routine over-designing, which introduces safety factors much in excess of the dictates of static loading requirements alone. This approach leads to costly and possibly wasteful use of materials, in that the structure is required to have both strength and bulk greater than would otherwise be necessary, and it nevertheless fails to correct either of the two major difficulties, namely, the tendencies toward resonant vibrations, and the tendencies to transmit shock and vibration forces to other delicate parts or equipments.

These resonance and high vibration transmissibility difficulties are particularly troublesome to the designer of devices specifically intended for use in a highly dynamic environment such as one involving severe accelerations, intense noise, and mechanical vibrations. Conventional efforts to overcome these difficulties have involved isolation by the introduction of accessory pads of isolating materials at support position, or damping, by the attachment of discrete dampers at positions of unwanted motion. Elastic or absorbent padding tends to be unsatisfactory as constituting a weak structural link between parts of a load-bearing assembly, and, moreover, it does not prevent the isolated parts themselves from resonating once vibrational energy has reached them. Accessory dampers, such as dashpots and the like, tend to involve costly installation procedures, interfere with mechanical nicety of design, and add undesirable bulk. Isolation and damping problems are particularly severe in the case of structural members having sheet-like proportions, inasmuch as these are highly vibratile and are known to respond even to noise-induced forces transmitted through the ambient atmosphere. Such large-area members are commonly used in panelling and in chassis constructions, where it is important not only that they withstand harsh dynamic environments but that they also function as load-carrying elements for the relatively static loads of the assembly or of mounted components and hardware. In such applications, it often proves unpractical and uneconomical to attempt to isolate each section of sheet material, or to affix discrete accessory dampers laboriously at a number of sites where vibration should be suppressed. While the needed high static strength of such sheet materials can be realized at the expense of large bulk and mass of stock, these compromises are unacceptable for many applications.

In accordance with teachings of this invention, composite members which have the general appearance and handling characteristics of solid structural stock, and which have either simple planar or more complex configurations, themselves inherently develop both the needed self-damping characteristics and high structural strength. This is accomplished through a fabrication which involves laminating, interposing critical layers of permanently viscous material between the laminations, and providing special fastenings mated with the laminated parts at distributed positions. As is discussed later herein, the resulting unique composite members become substantially immune to occurrence of destructive resonance conditions, are materially less susceptible to fatigue failures, inherently suppress vibration transmissibility and resonant magnifications, are of economical manufacture, and lend themselves to use in the manner of standard commercial stock.

Therefore, it is one of the objects of the present invention to provide novel and improved composite laminated structural members which are inherently self-damped against excessive responses to vibration and which yet possess high structural strength under severe loading.

A further object is to provide improved self-damped sheet stock fabricated of metal laminae separated by a permanently viscous medium, in which the laminae are preserved from slipping in relation to one another beyond predetermined amounts by distributed locking elements such that responses to vibration are suppressed and the bulk and weight of material required to withstand high static and dynamic loadings are minimized.

Another object is to provide self-damped laminated structural stock of low-cost manufacture including laminae of substantially the same thickness and which yet possesses certain structural strength characteristics approximating those of solid stock of like proportions.

By way of a summary account of practice of this invention in one of its aspects, there is provided a panel member fabricated from a plurality of metal laminae which are in superimposed coextensive relationship. Each of the metal laminae is of at least a minimum thickness which will preserve a plate-like stiffness characteristic and which therefore enables each lamina to resist both substantial tension and compression without either tearing or buckling. Intermediate to the adjacent laminae, and completely covered by them except at the thin outer edges of the panel, there is disposed a continuous layer of permanently viscous or visco-elastic damping medium of a substantially uniform thickness at about a few thousandths of an inch, the damping medium thickness being small in relation to the total thickness of the panel. The damping medium is selected to exhibit both high molecular cohesiveness and high molecular adhesiveness to the metal surfaces of the laminations, whereby it develops a firm tendency for the damping medium to preserve the laminae in substantially the same coextensive relationship they have when initially pressed together with the damping medium between them. Despite the tenacity of this bonding, the viscous medium nevertheless permits the adjacent surfaces of the laminations to develop some slip in relation to one another, even though by only minute amounts, as the panel experiences flexure in response to impressed shock or vibration forces. The important shearing effects which are developed within the damping medium at such times dissipate significant quantities of the unwanted energy. However, it is found that when the laminations are sufficiently free to experience the needed relative slipping movements they are also so free that they can react somewhat independently to the applied loads, and this has the result that the maximum structural rigidity is small when compared with that of a solid plate of the same material and same overall thickness. This is explained by the well known fact that the moment of inertia, which is a measure of strength, is proportional to the cube of the thickness, considering a plate of rectangular cross-section. These structural rigidity limitations are very effectively overcome by special fasteners, in the preferred form of rivets, which are mated with the laminations while having a minute freedom of movement in relation to them and which are nevertheless effective to lock the plural laminations together when they exceed a predetermined minimum flexure under either static or dynamic conditions. For this purpose, a number of such rivets are added to the composite plate structure at spaced regularly-distributed positions and are preferably formed with their heads substantially flush with the outer surfaces of the plate structure to duplicate the smooth external appearance of solid stock.

Although the features of this invention which are believed to be novel are set forth in the appended claims, further details of the invention in its preferred embodiments, and the further objects and advantages thereof, may be most readily comprehended through reference to the following description taken in connection with the accompanying drawings, wherein:

FIGURE 1 depicts a cross-sectional fragment of a self-damped laminated panel having distributed rivet fasteners for improvement of structural strength, certain of the rivets being shown pictorially;

FIGURE 2 is an enlarged cross-section of part of another self-damped structural member in which structural strength is aided by the action of nut-and-bolt type fasteners, the latter being shown in full;

FIGURE 3 graphically portrays typical resonant magnification and vibration transmissibility characteristics, in the region of fundamental mode vibration, of laminar sheet members incorporating different damping media;

FIGURE 4 compares graphically the strength (load vs. deflection) characteristics of laminae, solid members, and composite self-damped structures in which these teachings are practiced;

FIGURE 5 represents graphically the dynamic effects experienced when the amplitudes of loading vary rapidly with time;

FIGURE 6 is a schematic illustration of a damper model which aids in an understanding of certain of the dynamic operating characteristics of the improved self-damped panelling;

FIGURE 7 is a cross-sectioned view of an improved structural member according to the present invention, with two of the rivets shown in full—undergoing flexure within a limited range in which damping occurs;

FIGURE 8 is a further view of the member illustrated in FIGURE 5 undergoing flexure during which locking of the laminae occasions heightened structural strength;

FIGURE 9 is a cross-sectioned pictorial illustration of an improved shaped chassis structure which departs from a purely flat configuration; and FIGURE 10 provides a fragmentary cross-section of a self-damped member in which the fastening for improvement of structural strength is developed by a form of stapling, the latter being shown in full.

The panel-type composite member 1 depicted in FIGURE 1 includes a number of equal-thickness metal laminae, 2–5, which are parallel and coextensive and are separated from one another by thin and continuous layers of a substantially permanently viscous or viscoelastic damping medium 6. Although the thickness of this damping medium in relation to other components of the structure have been somewhat exaggerated for purposes of clarity in the illustration, it should be understood that in practice the layer thicknesses are intentionally kept small, and the molecular cohesion within the medium and molecular adhesion of the medium to the material of the laminae are selected to be high, whereby the layers of damping medium will not become discontinuous and will not detach themselves or flow or leak out of the illustrated positions. A silicone-base material of between about 500,000 and several million centistoke viscosity represents one form of suitable damping material, with a layer thickness not exceeding about 25-thousandths of an inch. A doubly-coated tape having damping medium applied to both sides and having a like viscosity characteristic may also be used. The metal laminae themselves are each about $\frac{1}{16}$ inch thick in a typical construction, such that the overall panel thickness of this construction is only about $\frac{1}{4}$ inch, and typical materials are given by the examples of aluminum, magnesium and steel, with which the damping material develops high molecular adhesion despite the relatively smooth surfaces of the laminae. Each of the metal laminae exceeds a predetermined minimum thickness which imparts a plate-like stiffness to the lamina and thereby enables it to resist substantial tension and compression without either tearing or buckling. Laminae of less than about ten-thousandths inch thickness of aluminum behave more as foil than plate, for example, and are not used.

At uniformly-spaced sites along the panel there appear small rivets 7, which extend transversely to the parallel laminae and are captured in position by way of their enlarged ends, shown in the form of opposed buttonheads 8 and 9. By way of preparation for this riveting, the metal laminae are preferably stacked and pressed firmly together, with the damping medium between them, and then drilled through at each of the positions which is to receive a rivet, as at the position of drilled cylindrical opening 10. Each of the cylindrical openings is of a diameter minutely in excess of the diameter of the rivet shank which it accommodates, with the result that a corresponding minute radial clearance, such as clearances 11, is insured between the rivet shanks and the apertures in the surrounding metal laminae so long as the panel remains substantially flat and undisturbed. This affords freedom for the laminae to slip in relation to one another and thereby dissipate energy through shear of the damping medium, for damping purposes. At the same time, the relative diameters, and resulting minute clearances between the mated rivets and laminations, are intentionally preserved at such small values that the rivets and laminae become tightly locked, in the radial directions parallel with the planes of the laminae, before the panel can be sufficiently flexed by applied loads to reach the structural failure conditions which, absenting the rivets, would be expected under relatively low loading.

From the further enlarged illustration of another member 1a in FIGURE 2, it will be more readily perceived that the damping medium, 6a tends to fill the clearance spaces 11a between the laminations and the fastener, 7a. The latter is depicted as an alternative nut-and-bolt type unit, as an illustration of the variations which may be practiced according to dictates of the available manufacturing facilities and the intended application of the member, and corresponding reference characters are used in the two figures, distinguished in FIGURE 2 by addition of the letter *a*, in making the corresponding identifications. This filling of spaces 11*a* is not essential to basic operativeness of the structure, although it has the important effect of suppressing vibration and noise associated with the fastener. Fastener tightening, in the axial direction of either fasteners 7 or 7*a*, should not be so great as to bind the superpositioned laminae together immovably, else the required damping actions described later herein will not be developed, but they may nevertheless exert a substantial pressure on the outermost laminae and thus hold themselves and the laminae rather firmly in position without destroying the needed relationships of laminae and damping medium which have been illustrated.

The spacings 12 and 12*a* between the fasteners are preferably uniform, and are selected to promote the needed locking effects over relatively small areas of the entire panel without occasioning so many lamina openings that the panel strength is impaired and without adding unduly to the cost and complexity of fabrication. Having regard for these factors, a suitable spacing may be prescribed for the fasteners of any given sheet, and, where certain localized areas are known to be more susceptible to structural failures than others, the fastener distribution over these areas may be made somewhat closer than elsewhere, as an extra precaution to insure that the strengthening effects further described later herein will be optimized. Prefabricated stock, which is to be divided into sizes as required for general purpose applications, is manufactured with a regular and uniform spacing of the fasteners, and it may then be cut, pierced and bent in the manner of solid stock while preserving the improved characteristics. A satisfactory spacing, 12, for the form of panel section illustrated in FIGURE 1 is about 1%6 inches. Fastener material should have at least the same strength as that of the associated laminae, and preferably the materials are indentical. Shank diameters of suitable rivets in a construction like that of FIGURE 1 are conveniently about 3⁄32 inch. In other constructions, the shank diameter may be varied in accordance with the simple loadings to be withstood and with regard for the fact that the fasteners should not be of such extreme thinness that they will tend to cut into the laminae rather than merely bind against them under severe panel flexure conditions.

The character of improvements in damping which obtain from the aforementioned panel constructions is exhibited in the FIGURE 3 curves of vibration transmissibility vs. frequency, over a frequency range encompassing the fundamental mode of vibration of the panel. Vibration transmissibility, which is plotted logarithmically along the ordinate, expresses the ratio of amplitude of vibration induced in a supported sheet-like member to amplitude of the exciting vibration of the support. The frequency appearing logarithmically along the abscissa is chosen to represent the frequency of the vibratory excitation by the support, in terms of cycles/second modified by a constant, $k$ appropriate for the frequency range involved for any given member. Considering first the expected behavior of a single solid lamina with no associated damping whatsoever of total thickness equivalent to that of the composite laminations shown in FIGURE 1 and supported along one edge by a vibratory support structure, it is found that as the frequency of impressed excitation is increased the amplification of magnification of the applied vibration occurring at some panel position displaced remotely from the support is characterized by a curve such as curve 13. At its natural resonant frequency of vibration, $f_0$, this undamped solid panel theoretically approaches an infinite magnification of vibration; practically, of course, it generally reaches a very high value provided the panel remains intact. Occurrence of the resonance condition is distinctly undesirable, therefore, and is sought to be avoided. One approach has involved increasing the panel thickness, and mass, such that the resonance frequency is shifted upwardly beyond a contemplated range of vibrations. Alternatively, or in conjunction with this upward shifting, the panel can be made of stronger material which will more safely withstand the maximum vibrations, although the undesirable effect of both practices is to increase the bulk and material costs far in excess of what would be required to satisfy static loading requirements alone. Moreover, where the panel thickness and mass is increased for purposes of added strength and of shifting the resonance frequency upwardly (i.e., detuning), the maximum magnification or vibration transmissibility is not thereby reduced but is merely shifted higher into the frequency spectrum without attenuation. Curve 14 represents such a condition, the resonant frequency, $f_h$, being theoretically infinite and, in practice, disturbingly high. Modern requirements calling for minimum vibration response over a very wide range of frequencies often forestalls use of this approach, because the resonance frequency cannot practically be moved out of the range of predicted environmental conditions. If all the laminae in FIGURE 1 were used together, but without being integral with one another and without a damping medium between them, they each merely behave in the manner shown by curve 13, and the amplification is essentially undamped and distressingly high.

However, the response characteristic can be significantly improved when the permanently viscous damping medium 6 possessing optimum qualities is introduced. Damping medium having an excessive and extremely high viscosity causes the four separate laminae to behave much like one solid sheet of the same overall thickness, and the magnification curve remains highly peaked, as shown by curve 15. Similarly a damping material of very low viscosity yields an unwanted highly peaked resonance condition, as shown by curve 16. Dynamic behavior is materially bettered when the damping medium possesses an optimum viscosity, however, the response characteristic depicted by curve 17 illustrating that there is a low finite maximum magnification at the resonant frequency, $f_r$, and that the magnification curve is also desirably broad and flattened rather than sharply peaked. Both the damping layer thickness and viscosity are known to influence the damping characteristic, the principal action being that of viscous shear in the damping medium in response to minute slippages between adjacent surfaces of the laminae as the panel undergoes vibration. Despite the small motions involved, there are relatively large total areas over which the shearing is developed, and this promotes the dissipations of sufficient quantities of energy at sufficiently high rates to accomplish a highly satisfactry damping of vibration.

Each of the laminae of the composite member exhibits a plate-like stiffness which enables it to resist appreciable tension and compression without buckling or tearing under either the forces due to static loading or the dynamic forces of shock and vibration. A thinner lamina, having foil-like characteristics, is incapable of making any significant contribution to support a load, is unable to produce optimum relative slippages for damping purposes, cannot lock in the desired manner with associated fasteners, and, when it constitutes an exterior lamina, does not have satisfactory resistance to abrasion and impact. For example, useful panel materials which include aluminum, magnesium, beryllium and steel are found to have unwanted foil-like qualities when in thicknesses below about the ten-thousandths inch value already referred to.

In general, the objectives of securing maximum structural strength and optimum self-damping tend to be incompatible. This is attested to by the fact that in the process of laminating a member to develop shear damping one reduces its total load-carrying capacity. In this connection, the moment of inertia of corresponding solid and laminated members of rectangular cross-section should be considered. The cross-sectional moment of inertia of a rectangular member about its neutral axis constitutes the variable in the respective cases, and is known to be equal to $\frac{1}{12} bd^3$, where $b$ is the breadth and $d$ the depth of the member. Accordingly, where the breadth is the same, the moments of inertia vary as the cube of the depth. Taking the example of a solid having a ¼ inch thickness, for which the cube of the depth is numerically $\frac{1}{64}$, and the example of a four-ply assembly of separate laminae each $\frac{1}{16}$ inch thick, for which the total of cubes of depths is numerically $\frac{1}{1024}$ (i.e., $$\frac{1}{4096} + \frac{1}{4096} + \frac{1}{4096} + \frac{1}{4096})$$

it is apparent that the maximum moment of inertia of the solid member is 16 times that of the comparable laminated member involving exactly the same amount of the same material. This laminated arrangement involves the same lamina thickness ascribed to the laminae in the panel of FIGURE 1, and it would be expected that the penalty in loss of strength is comparable because the damping medium 6 does not suffice to make the laminae integral with one another. This would be true were it not for the action of the fasteners which serve to unite the separate laminae and cause them to function in the manner of a single solid member and with a strength approaching that of a single solid member when the panel flexures exceed a small predetermined value. Up to the point where such minimum flexure is encountered the panel possesses only the relatively low combined strengths of the laminae acting individually, although this is not troublesome because the increased strength is immediately brought into play as needed in response to static or dynamic loadings which develop the greater flexures. The importance of this dual character of the structure appears from the facts that under conditions of the small limited amounts of flexure the damping is high and that under conditions of high flexures the structural strength is high, whereby the seemingly irreconcilable interests in damping and strength are satisfied in terms of a simple structure having a high degree of mechanical nicety.

In FIGURE 4, typical substantially linear load vs. deflection characteristics of a solid member and composite laminated member are represented by curves 18 and 19, respectively. The relatively low slope of the latter is attributable to the lower moment of inertia which appears in the case of the laminated member, and the low moment of inertia accounts for its lower maximum load limit 20. A static loading, or peak transient loading which is only slightly in excess of the maximum loading capacity of the laminated member, and could therefore induce its failure, would nevertheless have been well within the capacity of the comparable solid member. This very drawback is overcome by action of the rivets or other fasteners which, at some predetermined level of deflection 23, impart the rigidity of a solid member to that which is actually laminated. As is shown by curve 24, the load vs. deflection characteristic follows that of curve 19 up to the cross-over levels 25 and thereafter approximates the slope of the solid member curve 18. The most commonly experienced dynamic loadings, such as those of a cyclic vibration plotted at 26 in the FIGURE 5 plot of vibration amplitude vs. time, are below the loading levels 25, and the slipping laminae therefore operate continuously to develop shear damping which efficiently prevents both unwanted resonant magnification and the transmission of material amounts of vibration to other structure. However, even when the cross-over values of loading are exceeded, dynamically, as in the case of a loading varying in the cyclic manner represented by curve 22, FIGURE 5, the damping effects are realized during intervals between the lockings in opposite directions. An explanation of such separate intervals of damping is offered through reference to a schematically-illustrated model appearing in FIGURE 6, wherein a piston damper, D, on member M, can travel only in small limited distance within a cylinder, C, which is supported with relatively movable member M2. The limits of travel of the damper D within the fluid-filled dashpot chamber C wolud be as designated by the reference characters 23a and 23b. Damping can occur only during the times when these limits of travel are not reached, that is, during the periods when deflections are within the amplitude regions characterized by the shaded regions 27 in the dynamic curves of FIGURE 5. Whether the amplitude of motion exceeds the limits 23, as in the case of curve 22, or lies wholly within these limits, as in the case of curve 26, damping takes place. Because damping does not occur at every instant in the case of high dynamic loadings such as that of curve 22, maximum transmissibility tends to be somewhat higher (point 28 on curve 17, FIGURE 3) than the theoretical optimum point 29 in FIGURE 3. This slight difference is entirely acceptable, however, particularly since it is so advantageously offset by the important gains in structural strength.

Modes of operation during the low flexure conditions, which involve pure damping, and during the high flexure conditions, which introduce locking, are exhibited by the illustrations of FIGURES 7 and 8, respectively. A panel section 30 is shown tightly secured to a support 31 along one edge, while the portions displaced from the support undergo relative flexural motions. The four coextensive parallel metal laminae 32–35 are separated by a damping medium 36 and capture a plurality of distributed countersunk rivets 37 in accommodating transverse openings of minutely larger diameters. Under average dynamic conditions involving relatively small flexure (FIGURE 7), points 38 and 39 on adjacent laminae surfaces which had been directly opposite one another in a passive or unflexed state of the panel become laterally displaced, as shown, and the act of this displacement involves shearing of the constrained damping medium adhering to these laminae. It is this shearing which occasions the principal damping. Because both of the laminae under discussion, 32 and 33, are stiff and plate-like, the relative displacements at their interfaces is the consequence of tension and compression on their opposite sides as they are flexed. Considering the effects of tension and compression on plate 33, it is seen that at the site of each rivet hole the upper and lower edges 40 and 41 are laterally displaced, but not so much that they develop a binding with the rivets. The laminae are thus permitted to slip freely in the aforesaid manner, so long as the limits of flexure are slight, as suggested by the full-line showing and dashed-line outline 42 in FIGURE 7. Greater flexure than this is indicated by the full-line showing and dashed-line outline 43 in FIGURE 8. Under the latter conditions, the maximum relative slip is limited by the binding which ultimately occurs between the edges of the laminae and the rivets. Such binding is shown between rivet 37 and laminae edges 40 and 45 in FIGURE 8, it being apparent that maximum deflection in the opposite direction will develop a like binding of the rivet between the remaining edges 41 and 44 at the same location. The binding of a single lamina with the rivets is of no consequence, and will not even occur, unless there is at least one other adjacent lamina performing similarly. Rather, the plural laminae each become bound with the rivets, and with each other through the rivets, to increase the effective structural strength of the panel by causing it to behave in the manner of a solid element.

The structures in which this invention may be practiced can be of various forms, and channel-shaped structural member 46 in FIGURE 9 illustrates that the present teachings are applicable where the resulting configurations are not wholly flat. Bent edges 47 and 48 are each provided with countersunk rivets 49, as is the intermediate section 50, whereby the external surfaces are virtually as smooth and regular as solid stock while at the same time all parts of the member are self-damped and have an improved structural strength not otherwise to be expected from the separate contributions of four equal-thickness laminae 51–54. Viscous damping medium 55 performs the needed damping actions and also serves to seal the openings through which the rivets are passed. In fabricating this assembly the laminae are first preferably superimposed in a perfectly flat condition, with the damping medium between them, and the rivet holes only for the rivets in section 50 are drilled and filled with the rivets. Thereafter, the bends 56 and 57 are made, and the rivet holes then drilled and filled with rivets. This procedure insures that the rivets in sides 47 and 48 are normally free for purposes of the damping and are not initially locked with the laminae as the result of different lamina slippages during the bending operations.

The alternative fastening arrangement which appears in FIGURE 10 offers certain advantages in the fabrication of thin composite self-damped stock. Equal-thickness laminae 59–62 there trap an industrial type staple 63 the legs of which occupy two small prepared openings 64 and 65 with the required clearances for damping purposes. Spacing between the parallel staple legs is preferably relatively close, and the cross-bar does not immobilize the stock against harmless normal flexures.

It should be understood that the specific embodiments of the invention disclosed herein are intended to be of a descriptive rather than a limiting character, and that various changes, combinations, substitutions or modifications may be effected in practice of these teachings without departing either in spirit or scope from this invention in its broader aspects.

I claim:

1. A self-damped composite structural assembly which is subject to flexural movements responsive to excitation of a vibratory character, comprising at least a pair of load-supporting members having substantially planar surfaces in coextensive parallel laminar relationship, each of said members having a thickness imparting a structural stiffness to withstand part of the loads imposed upon said member, damping material interposed in a layer between and adhering to the adjacent planar surfaces of said members, said material being subject to shear and dissipating energy responsive thereto while permitting relative slip between said members in directions parallel with said surfaces upon occurrence of said flexural movements of said assembly, and a plurality of locking means supported by said members at each of a plurality of substantially uniformly spaced positions and distributed across areas of said members required to be of greater structural strength than that of the combined strengths of said members acting individually, each of said locking means including a part extending transversely to said surfaces and mating said members with limited freedom for minute relative slip therebetween in said directions, whereby vibration transmissibility and resonant magnification of said assembly are suppressed by dissipation of energy in said material, and said members are locked together in said directions to develop said greater structural strength upon occurrence of flexures of said assembly beyond small limited amounts.

2. A self-damped composite structural assembly subject to flexural movements responsive to excitation of a vibratory character, comprising at least a pair of metal load-supporting members having substantially planar surfaces in coextensive parallel laminar relationship, each of said members having a thickness imparting a structural stiffness to withstand part of the loads imposed upon said members, damping material interposed in a layer between and adhering to the adjacent planar surfaces of said members, said material being subject to shear and dissipating energy responsive thereto while permitting relative slip between said members in directions parallel with said surfaces upon occurrence of said flexural movements of said assembly, each of said members having a plurality of substantially uniformly spaced openings therethrough transversely to said surfaces and aligned with corresponding openings of the same cross-section through other of said members and distributed across areas of said members required to be of greater structural strength than that of the combined strengths of said members acting individually, a plurality of fasteners each supported by said members and projecting through different aligned openings in said members, the cross-sections of said fasteners through said openings being minutely smaller than the cross-sections of said openings, whereby said material dissipates vibrational energy upon occurrence of relative slip between said members, and said fasteners lock said members together in said directions to develop said greater structural strength of said assembly upon occurrence of flexures thereof beyond small limited amounts.

3. A self-damped composite structural panel which withstands relatively high loadings and suppresses effects of vibration, comprising a plurality of superpositioned solid metal laminations having substantially planar surfaces in coextensive parallel relationship, said laminations being of substantially the same uniform thickness and modulus of elasticity and each having a stiffness characteristic of plate material which enables it to withstand loadings in tension and compression without tearing and buckling, a substantially permanently viscous damping material uniformly distributed in a thin continuous layer between said surfaces of adjacent ones of said laminations, said material having a coefficient of viscosity of at least 500,000 centistokes and retaining itself between said laminations by molecular adhesion with the metal of said laminations and by molecular cohesion within said material, each of said laminations having a plurality of uniformly-spaced cylindrical openings therethrough aligned with corresponding openings in the other lamiantions and distributed across areas of said laminations required to be of greater structural strength than that of the combined strengths of said laminations acting individually, a plurality of metal rivets each having at least the same modulus of elasticity as said laminations and each projecting through different aligned openings in said laminations with the heads thereof disposed to engage the outermost laminations of said panel and to exert pressure therebetween insufficient to expel said material from between said laminations, the cross-sections of said rivets being minutely smaller than the diameter of said openings, whereby said rivets permit minute relative slip between said laminations upon occurrence of flexural movements of said panel below a small limited amount and lock said laminations together rigidly to develop said greater strength of said panel upon occurrence of flexural movements in excess of said limited amount.

4. A prefabricated self-damped structural sheet of composite construction which possesses structural strength and external form approximating those of solid stock, comprising a plurality of superpositioned flat solid metal laminations, said laminations being of substantially the same uniform thickness and modulus of elasticity and each having a stiffness characteristic of plate material which enables it to withstand loadings in tension and compression without tearing and buckling, each of said laminations having a plurality of uniformly-spaced cylindrical openings therethrough aligned with corresponding openings in the other laminations and distributed across areas of said laminations required to be of greater structural strength than that of the combined strengths of said laminations acting individually, a plurality of metal countersunk rivets each having at least the same modulus of elasticity as said laminations and each projecting through different aligned openings in said laminations with the countersunk heads thereof disposed substantially flush with the outermost surfaces of said panel, the cross-sections of the shanks of said rivets being minutely smaller than the diameters of said openings to accommodate minute relative slip between said laminations upon occurrence of flexural movements of said panel below a small limited amount, and damping material interposed in a layer between the adhering to the adjacent surfaces of said laminations and interposed between said rivets and the edges of said laminations surrounding said openings, said material being subject to shear and dissipating energy responsive to said minute relative slip, said rivets locking said laminations together rigidly upon occurrence of flexural movements in excess of said limited amount to develop said greater structural strength of said panel.

References Cited in the file of this patent

UNITED STATES PATENTS

| | | |
|---|---|---|
| 1,193,013 | Grant | Aug. 1, 1916 |
| 2,028,950 | Randall | Jan. 28, 1936 |
| 2,129,308 | Randall | Sept. 6, 1938 |
| 2,237,623 | Ledwinka | Apr. 8, 1941 |
| 2,395,556 | Kopplin | Feb. 26, 1946 |
| 2,407,400 | Chamberlain | Sept. 10, 1946 |
| 2,460,181 | Marshall | Jan. 25, 1949 |
| 2,467,853 | Poskett et al. | Apr. 19, 1949 |
| 2,819,032 | Detrie et al. | Jan. 7, 1958 |